(12) United States Patent
Huang et al.

(10) Patent No.: US 9,104,057 B2
(45) Date of Patent: Aug. 11, 2015

(54) LIQUID-CRYSTAL DISPLAY (LCD) PANEL CAPABLE OF ACHIEVING LOW-TEMPERATURE DISPLAY

(71) Applicants: BOE TECHNOLOGY GROUP CO., LTD., Beijing (CN); BEIJING BOE DISPLAY TECHNOLOGY CO., LTD., Beijing (CN)

(72) Inventors: Changgang Huang, Beijing (CN); Hongjiang Wu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/093,592

(22) Filed: Dec. 2, 2013

(65) Prior Publication Data

US 2014/0152937 A1    Jun. 5, 2014

(30) Foreign Application Priority Data

Dec. 3, 2012  (CN) .......................... 2012 1 0508732

(51) Int. Cl.
| | |
|---|---|
| *G02F 1/133* | (2006.01) |
| *G02F 1/1333* | (2006.01) |
| *G02F 1/1362* | (2006.01) |
| *G02F 1/1345* | (2006.01) |
| *G02F 1/1335* | (2006.01) |

(52) U.S. Cl.
CPC ........ *G02F 1/133382* (2013.01); *G02F 1/1362* (2013.01); *G02F 1/13452* (2013.01); *G02F 2001/133567* (2013.01)

(58) Field of Classification Search
CPC .................................................. G02F 1/133382
USPC ............................................................ 349/72
See application file for complete search history.

(56) References Cited

U.S. PATENT DOCUMENTS

| | | | |
|---|---|---|---|
| 2005/0073642 A1 * | 4/2005 | Dunn et al. | 349/199 |
| 2005/0285994 A1 * | 12/2005 | Park et al. | 349/72 |
| 2008/0100791 A1 * | 5/2008 | Chen et al. | 349/161 |
| 2008/0316416 A1 * | 12/2008 | Chang et al. | 349/150 |

FOREIGN PATENT DOCUMENTS

JP        2007147694 A   *   6/2007

* cited by examiner

*Primary Examiner* — Thanh-Nhan P Nguyen
(74) *Attorney, Agent, or Firm* — Ladas & Parry LLP

(57) ABSTRACT

A liquid-crystal display (LCD) panel capable of achieving low-temperature display comprises an opposing substrate. a thin-film transistor (TFT) substrate and a liquid crystal layer disposed between the opposing substrate and the TFT substrate, a TFT pattern including gate lines and data lines is disposed on the front side of the TFT substrate, and an electrical heating pattern corresponding to the TFT pattern is disposed on the back side of the TFT substrate.

7 Claims, 2 Drawing Sheets

LIQUID-CRYSTAL DISPLAY (LCD) PANEL CAPABLE OF ACHIEVING LOW-TEMPERATURE DISPLAY

TECHNICAL FIELD

An embodiment of the present technical disclosure relates to a liquid-crystal display (LCD) panel capable of achieving low-temperature display.

BACKGROUND

Due to the characteristics of light weight, small thickness, good portability and the like, LCD panels have been widely applied to various domestic televisions and portable electronic products. A typical LCD panel usually can only operate normally around the normal temperature, so that general indoor workplaces can meet the display requirement. However, as for cold climate areas or workplaces at an extremely low temperature, as liquid crystal molecules at the low temperature cannot be deflected properly, the LCD panel cannot operate normally.

In order to solve the problem of low-temperature display, the following methods have been proposed to achieve low-temperature liquid-crystal display:

1) An additional electrical heating element is arranged on the outside of the LCD panel, and heating to the display panel can be conducted through a control circuit. For instance, one layer of heating sleeve is attached on the back side of the whole LCD panel to heat the LCD panel, so that the LCD panel can display at a low temperature. However, as the electrical heating element has a big thickness and large weight in kilogram level, the structure will increase the overall thickness and the overall weight of the LCD panel.

2) A glass substrate, on which a indium tin oxide (ITO) transparent conductive film is deposited, is arranged between a backlight and a thin-film transistor (TFT) substrate, and the low-temperature display function can achieved by heating on the liquid crystal cell of the display panel with the transparent conductive film. However, as the ITO transparent conductive film has a poor heating effect, the heat which can be supplied to the liquid crystal cell may be very limited. In addition, as glass has poor heat conductibility, most heat produced by the ITO transparent conductive film is lost during the process of being transmitted to the liquid crystal cell via the heat transmission of the glass substrate. Therefore, by adoption of the structure, the heating effect of the LCD panel will be poor. Moreover, due to the glass substrate, the transmittance can be reduced and the weight of the LCD panel can be increased.

3) One layer of ITO film is deposited on the back side of the TFT substrate, and applying voltage to the ITO film to heat the display panel. By adoption of the method, the transmittance of the LCD panel will be reduced as well and the heating effect will be poor.

SUMMARY

An embodiment of the present technical disclosure provides an LCD panel capable of achieving low-temperature display, which can achieve low-temperature display in the case of not affecting the transmittance.

According to one aspect of the present technical disclosure, an LCD panel capable of achieving low-temperature display is provided. The LCD panel comprises an opposing substrate, a thin film transistor (TFT) substrate and a liquid crystal cell disposed between the opposing substrate and the TFT substrate, a TFT pattern including gate lines and data lines is disposed on the front side of the TFT substrate, and an electrical heating pattern corresponding to the TFT pattern is disposed on the back side of the TFT substrate.

For instance, the TFT substrate may further include: a control circuit board arranged on the same side with the electrical heating pattern and a temperature sensor arranged on a side wall of the TFT substrate; a control circuit on the control circuit board is respectively connected with the electrical heating pattern and the temperature sensor.

For instance, the electrical heating pattern may be made of a material which can emit heat under application of a voltage.

For instance, the material may be Fe—Cr—Al alloy or Ni—Cr alloy.

For instance. the control circuit board may be bonded on the TFT substrate.

For instance, the control circuit board may be bonded on the TFT substrate via conductive adhesive.

For instance, the control circuit board is independently arranged or integrated into a drive circuit board of the TFT substrate.

For instance, the temperature sensor may be bonded on the side wall of the TFT substrate.

Further scope of applicability of the present technical disclosure will become apparent from the detailed description given hereinafter. However, it should be understood that the detailed description and specific examples, while indicating preferred embodiments of the technical disclosure, are given by way of illustration only, since various changes and modifications within the spirit and scope of the technical disclosure will become apparent to those skilled in the art from the following detailed description.

BRIEF DESCRIPTION OF THE DRAWINGS

The present technical disclosure will become more fully understood from the detailed description given hereinafter and the accompanying drawings which are given by way of illustration only, and thus are not limitative of the present technical disclosure and wherein.

REFERENCE NUMERALS

1. Backlight; 2. Opposing Substrate; 3. TFT Substrate; 31. Electrical Heating Pattern; 32. TFT Pattern; 33. Glass Substrate; 4. Control Circuit Board; 5. Temperature Sensor.

DETAILED DESCRIPTION

For more clear understanding of the objectives, technical solutions and advantages of the embodiments of the present technical disclosure, clear and complete description will be given below to the technical solutions of the embodiments of the present technical disclosure with reference to the accompanying drawings of the embodiments of the present technical disclosure. It will be obvious to those skilled in the art that the preferred embodiments are only partial embodiments of the present technical disclosure but not all the embodiments. All the other embodiments obtained by those skilled in the art without creative efforts on the basis of the embodiments of the present technical disclosure illustrated shall fall within the scope of protection of the present technical disclosure.

In an LCD panel provided by the embodiment of the present technical disclosure, an electrical heating pattern corresponding to gate lines and data lines disposed on the front side of a TFT substrate is deposited on the back side of the TFT substrate by a patterning process and configured to heat the LCD panel through an additionally arranged control circuit board and an additionally arranged temperature sensor.

Figure 1:
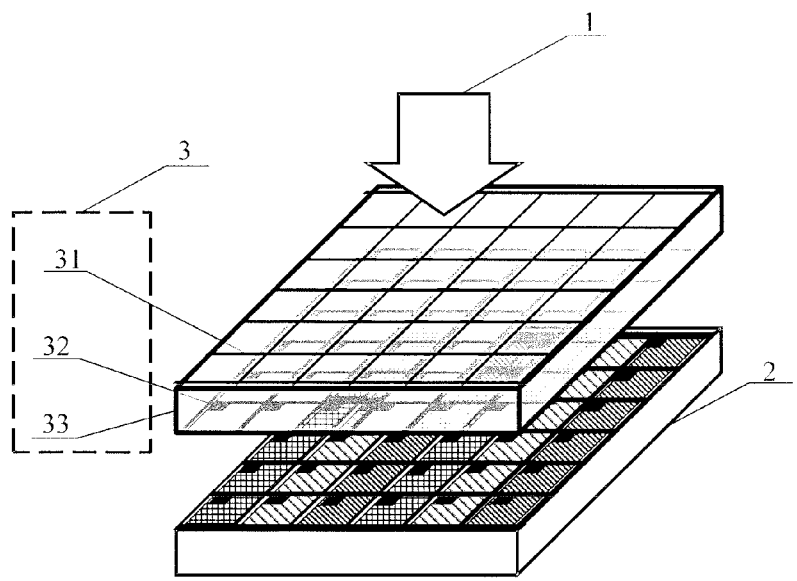
FIG. 1 is a schematic structural view of an LCD panel capable of achieving low-temperature display, according to an embodiment of the present technical disclosure.

FIG. 1 is a schematic structural view of the LCD panel capable of achieving low-temperature display, according to an embodiment of the present technical disclosure. As illustrated in FIG. 1, the LCD panel comprises an opposing substrate 2, a thin film transistor (TFT) substrate 3 and a liquid crystal layer (not shown in FIG. 1) disposed between the opposing substrate 2 and the TFT substrate 3. A backlight unit (backlight) is arranged on the back side of the LCD panel, so that the backlight 1 can be incident from the back side of the TFT substrate 3. The TFT substrate 3 includes: an electrical heating pattern 31, a TFT pattern 32 including the gate lines and the data lines, and a glass substrate 33.

The TFT substrate (array substrate) of the embodiment of the present technical disclosure includes a plurality of gate lines and a plurality of data lines which are intersected with each other to define pixel units arranged in an array. For instance, each pixel unit includes a TFT working as a switching element and a pixel electrode configured to control the arrangement of liquid crystals. For instance, as for the TFT of each pixel unit, a gate electrode of is electrically connected or integrally formed with corresponding gate lines; a source electrode is electrically connected or integrally formed with corresponding data lines; and a drain electrode is electrically connected or integrally formed with a corresponding pixel electrode. The opposing substrate 2 is, for instance, a color filter substrate, which for instance comprises a black matrix and color filter units defined by the black matrix and corresponding to the pixel units of the TFT substrate. When the color filter units are arranged on the TFT substrate, the opposing substrate 2 may be not provided with the color filter units.

Figure 2:
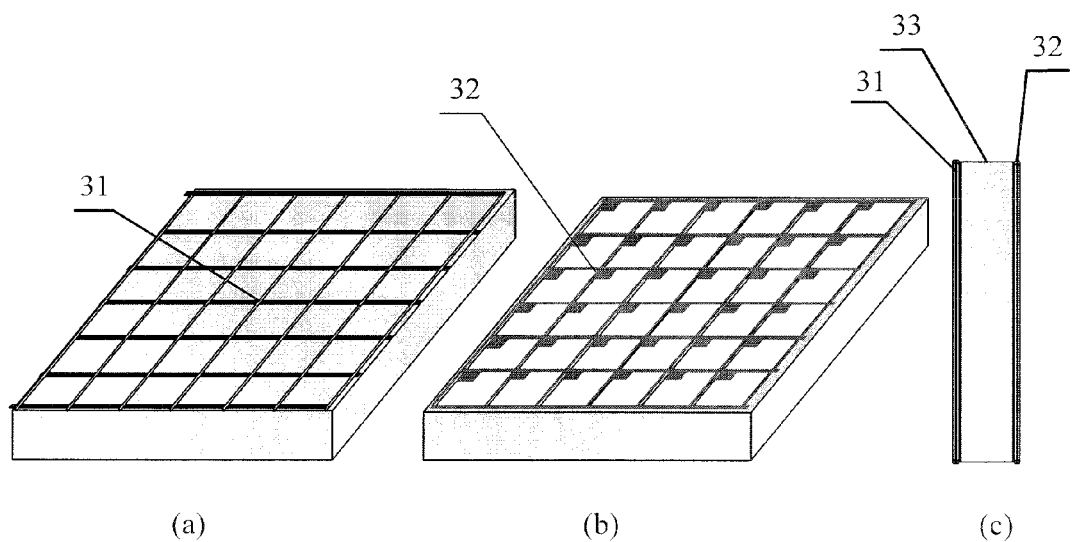
FIG. 2(a) is a schematic structural view of an electrical heating pattern disposed on the back side of a TFT substrate according to an embodiment of the present technical disclosure.
FIG. 2(b) is a schematic structural view of a TFT pattern disposed on the front side of the TFT substrate according to an embodiment of the present technical disclosure.
FIG. 2(c) is a sectional view of the TFT substrate according to an embodiment of the present technical disclosure.

The electrical heating pattern 31 is, as illustrated in FIGS. 1 and 2(a), disposed on the back side of the TFT substrate 3, namely the side into which the backlight 1 is incident, i.e., the side facing away from the liquid crystal layer. The TFT pattern 32 including the gate lines and the data lines is, as illustrated in FIGS. 1 and 2(b), disposed on the front side of the TFT substrate 3, namely the side from which the backlight 1 is emitted out, i.e., the side facing the liquid crystal layer.

It can be seen from FIGS. 1, 2(a) and 2(b) that: the electrical heating pattern 31 corresponds to the TFT pattern 32 including the gate lines and the data lines, disposed on the front side of the TFT substrate 3. For instance, both the electrical heating pattern 31 and the TFT pattern 32 are overlapped with each other in a direction perpendicular to the LCD panel and have equivalent dimensions so that the electrical heating pattern cannot shield a display area in the TFT pattern. The electrical heating pattern may be made of a material which can emit heat under application of a voltage, such as Fe—Cr—Al alloy or Ni—Cr alloy. As illustrated in FIG. 2(c) which is a sectional view of the TFT substrate 3, the electrical heating pattern 31 is disposed on one side of the glass substrate 33, and the TFT pattern 32 including the gate lines and the data lines is disposed on the other side.

Figure 3:
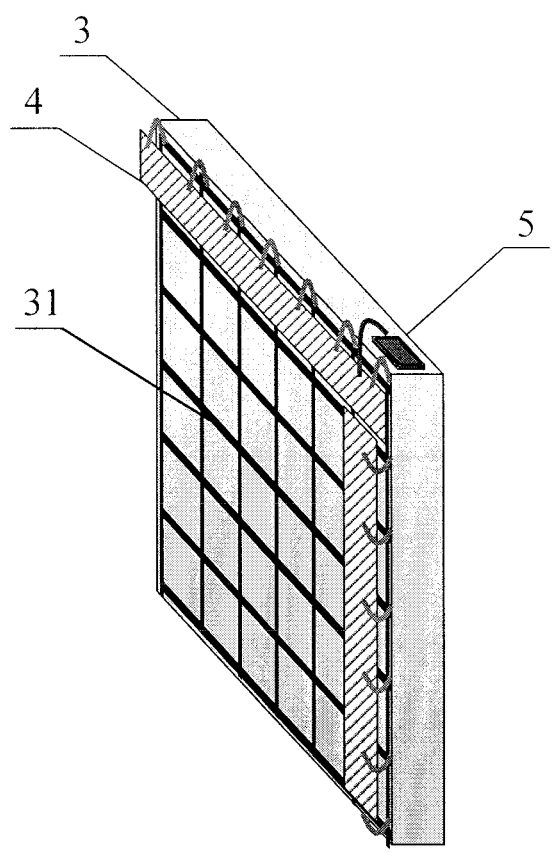
FIG. 3 is a schematic structural position diagram of a control circuit board and a temperature sensor on the TFT substrate according to an embodiment of the present technical disclosure.

FIG. 3 is a schematic structural position diagram of the control circuit board and the temperature sensor on the TFT substrate of the embodiment of the present technical disclosure. As illustrated in FIG. 3, the control circuit board 4 can be arranged on one side of the TFT substrate 3 on which the electrical heating pattern 31 is disposed, for instance, may be bonded on the TFT substrate 3 via conductive adhesive. In addition, a control circuit on the control circuit board 4 is connected with the electrical heating pattern 31. The bonding position of the control circuit board 4 may be similar to that of a drive circuit board of the TFT pattern on the TFT substrate. For instance, the control circuit board 4 is bonded on the substrate so that the light emitted by the backlight is not shielded and can completely pass through the display screen, and hence the transmittance cannot be affected. The temperature sensor 5 is arranged (by bonding, for instance) on the side wall of the TFT substrate 3 and connected with the control circuit on the control circuit board 4. In addition, the temperature sensor 5 can control the switching of the control circuit according to the difference between the ambient temperature and the temperature of the LCD panel, and hence achieve the aim of controlling the operation of the electrical heating pattern 31. The control circuit board 4 can be independently arranged, for instance, arranged into two or integrated into one, or integrated into the drive circuit board (printed circuit board assembly (PCBA)) (not shown in FIG. 3) of the TFT substrate.

Herein, both the temperature sensor 5 and the control circuit board 4 are light and thin elements, have low influence on the weight of the whole LCD panel, and will not affect the quality of the LCD panel basically.

During operation, the LCD panel detects the ambient temperature and the temperature of the LCD panel through the temperature sensor 5. When the ambient temperature is lower than the normal operating temperature of the LCD panel, the control circuit can automatically apply a working voltage to the electrical heating pattern 31 so as to heat the LCD panel, and hence the LCD panel will continue to operate normally. When the heating temperature of the LCD panel is overly high, namely higher than the normal operating temperature of the LCD panel, the control circuit can automatically stop applying the working voltage to the electrical heating pattern 31 and protect the LCD panel from being overheated. For instance, when the ambient temperature is equal to the normal operating temperature of the LCD panel, the control circuit can also automatically stop heating the LCD panel so as to protect the LCD panel from being overheated, and hence the LCD panel can operate normally and the objective of energy conservation can be achieved.

Simple description will be given below to the method for manufacturing the LCD panel capable of achieving low-temperature display, provided by the embodiment of the present technical disclosure. The opposing substrate in the LCD panel and the cell-assembly process (for forming a liquid crystal cell) can employ conventional ones in practice. The difference is the forming process of the TFT substrate. The processes can be conducted as follows.

Step 1: forming an electrical heating pattern on one side of a base substrate, and forming a TFT pattern including gate lines and data lines on the other side of the base substrate.

In one example, firstly, one layer of Fe—Cr—Al alloy or Ni—Cr alloy or the like is deposited on one side of the base substrate (for instance, a glass or plastic substrate) for forming an electrical heating film layer; secondly, a layer of photoresist is coated on the electrical heating film layer; and thirdly, the electrical heating pattern is formed by exposure. development, etching and photoresist removal. The process for forming the TFT pattern including gate lines and data lines on the other side of the base substrate comprises the following steps of: base substrate cleaning, film deposition, photoresist coating. exposure, development. etching and photoresist removal. In the exposure process, the position of the electrical heating pattern and the pattern of the gate lines and the data lines can be controlled by alignment marks, so that the positions of the electrical heating pattern and the pattern of the gate lines and the data lines can surely correspond to each other.

Here, the electrical heating pattern may be formed at first, or the TFT pattern including the gate lines and the data lines may be formed at first. However, in order to reduce the damage of the TFT pattern on the TFT substrate, the electrical heating pattern can be formed at first, and hence the TFT pattern is formed.

Step 2: arranging the control circuit board on one side of the TFT substrate on which the electrical heating pattern is disposed, and arranging the temperature sensor on the side wall of the TFT substrate.

The control circuit on the control circuit board is electrically connected with the electrical heating pattern and the temperature sensor respectively.

In one example, the control circuit board may be bonded on one side of the TFT substrate, on which the electrical heating pattern is disposed, via conductive adhesive, and the temperature sensor may be bonded on the side wall of the TFT substrate. The control circuit on the control circuit board is connected with the electrical heating pattern, and the temperature sensor is electrically connected with the control circuit on the control circuit board. The temperature sensor controls the switching of the control circuit according to the difference between the ambient temperature and the temperature of the LCD panel, and hence controls the temperature of the electrical heating pattern.

In the LCD panel capable of achieving low-temperature display, according to the embodiment of the present technical disclosure, the electrical heating pattern, corresponding to the gate lines and the data lines disposed on the front side of the substrate, is disposed on the back side of the TFT substrate by a patterning process. The patterned electrical heating pattern is combined with the control circuit board and the temperature sensor arranged so as to heat the LCD panel. As the electrical heating pattern corresponds to the pattern of the gate lines and the data lines, the electrical heating pattern does not affect the transmittance of the display panel. Moreover, the electrical heating pattern is combined with the control circuit board and the temperature sensor to heat the LCD panel, and hence the display function of the LCD panel at low temperature can be achieved.

Moreover, both the temperature sensor and the control circuit board provided with the control circuit, in the present technical disclosure, are light and thin elements, have very small influence on the quality of the whole LCD panel, and do not affect the weight of the LCD panel basically. Compared with the conventional technology. the LCD panel provided by the present technical disclosure has the advantages of light weight and small size.

The embodiment of the technical disclosure being thus described, it will be obvious that the same may be varied in many ways. Such variations are not to be regarded as a departure from the spirit and scope of the technical disclosure, and all such modifications as would be obvious to those skilled in the art are intended to be included within the scope of the following claims.

What is claimed is:

1. A liquid-crystal display (LCD) panel capable of achieving low-temperature display, comprising: an opposing substrate, a thin-film-transistor (TFT) substrate and a liquid crystal layer disposed between the opposing substrate and the TFT substrate,
    wherein a TFT pattern including gate lines and data lines is disposed on a front side of the TFT substrate; and an electrical heating pattern corresponding to the TFT pattern is disposed on a back side of the TFT substrate;
    the electrical heating pattern is made of Fe—Cr—Al alloy or Ni—Cr alloy, and the TFT substrate further includes a control circuit board arranged on a same side with the electrical heating pattern and a temperature sensor arranged on a side wall of the TFT substrate, a control circuit on the control, circuit board is respectively connected with the electrical heating, pattern and the temperature sensor.

2. The LCD panel capable of achieving low temperature display according to claim 1, wherein the control circuit board is bonded on the TFT substrate.

3. The LCD panel capable of achieving low-temperature display according to claim 2, wherein the control circuit board is bonded on the TFT substrate via conductive adhesive.

4. The LCD panel capable of achieving low-temperature display according to claim 1, wherein the control circuit board is independently arranged or integrated into a drive circuit board of the TFT pattern.

5. The LCD panel capable of achieving low-temperature display according to claim 1, wherein the temperature sensor is bonded on the side wall of the TFT substrate.

6. The LCD panel capable of achieving low-temperature display according to claim 1, wherein the control circuit board is independently arranged or integrated into a drive circuit board of the TFT pattern.

7. The LCD panel capable of achieving low-temperature display according to claim 1, wherein the temperature sensor is bonded on the side wall of the TFT substrate.

* * * * *